United States Patent
Onodi et al.

(10) Patent No.: US 10,381,812 B2
(45) Date of Patent: Aug. 13, 2019

(54) RISER, INSTALLATION KIT, AND ELECTRICAL INSTALLATION

(71) Applicant: Woertz Engineering AG, Muttenz (CH)

(72) Inventors: Tamas Onodi, Thalwil (CH); Andreas Dreier, Nunningen (CH)

(73) Assignee: Woertz Engineering AG, Muttenz (CH)

( * ) Notice: Subject to any disclaimer, the term of this patent is extended or adjusted under 35 U.S.C. 154(b) by 0 days.

(21) Appl. No.: 16/125,860

(22) Filed: Sep. 10, 2018

(65) Prior Publication Data

US 2019/0081465 A1    Mar. 14, 2019

(30) Foreign Application Priority Data

Sep. 12, 2017 (EP) .................................... 17190643

(51) Int. Cl.
*H02G 3/04* (2006.01)
*H01B 7/08* (2006.01)
(Continued)

(52) U.S. Cl.
CPC ............. *H02G 3/0456* (2013.01); *H01B 7/08* (2013.01); *H02G 3/26* (2013.01); *H02G 3/263* (2013.01); *H02G 3/32* (2013.01)

(58) Field of Classification Search
CPC ................................ H02G 3/0456; H01B 7/08
(Continued)

(56) References Cited

U.S. PATENT DOCUMENTS

| 4,318,563 A | 3/1982 | Fowler |
| 4,720,953 A * | 1/1988 | Onishi .................. H02G 3/288 |
| | | 174/497 |

(Continued)

FOREIGN PATENT DOCUMENTS

| DE | 2333392 A1 | 1/1975 |
| DE | 10240551 A1 | 3/2004 |

(Continued)

OTHER PUBLICATIONS

DIN 410212.
Lanz Oensingen AG, "Lanz—im Tunnel zuhause," Jul. 31, 2017, URL: http://www.lanz-oens.com/fileandmin/kataloge_pdfs/LANZ_Tunnel_1.6.pdf.

*Primary Examiner* — Timothy J Thompson
*Assistant Examiner* — Charles Pizzuto
(74) *Attorney, Agent, or Firm* — Frost Brown Todd LLC

(57) ABSTRACT

Described is a riser that is secured against downward movement, having an electrical riser flat cable that extends vertically or with a vertical component, and at least one riser securing device, surrounding the flat cable, for securing the riser flat cable against downward movement by pressing the flat cable against a nonconductive pressing surface both in the absence of a fire and in the event of fire. The riser securing device includes an electrically nonconductive, fire-resistant clamping element, spaced apart from the pressing surface, that is freely movably guided in an oblique guide that reduces the distance of the clamping element from the pressing surface during downward movement of the clamping element. When a downward tensile force acts on the flat cable, the flat cable is pressable against the pressing surface by the clamping element that is freely movable in the oblique guide and thus variable in its distance from the pressing surface, even when there is a change in the cable thickness, and is thus clampable between the clamping (Continued)

element and the pressing surface. The variability in spacing of the clamp corresponds at least to the difference between the thickness of the flat cable in the intact state and the thickness of the flat cable in the state of melted or burnt-off cable insulation.

14 Claims, 4 Drawing Sheets

(51) Int. Cl.
*H02G 3/00* (2006.01)
*H02G 3/32* (2006.01)

(58) Field of Classification Search
USPC ....................................................... 174/70 R
See application file for complete search history.

(56) References Cited

U.S. PATENT DOCUMENTS

| | | | |
|---|---|---|---|
| 4,889,320 | A | 12/1989 | Pasbrig |
| 8,998,150 | B2 * | 4/2015 | McMiles .................... F16L 3/08 248/316.1 |
| 2004/0048522 | A1 | 3/2004 | Facey et al. |
| 2007/0066101 | A1 | 3/2007 | Suzuki |
| 2011/0247875 | A1 | 10/2011 | Onodi |

FOREIGN PATENT DOCUMENTS

| | | |
|---|---|---|
| DE | 102006031912 A1 | 2/2007 |
| DE | 102006043276 A1 | 10/2007 |
| DE | 102006021555 A1 | 11/2007 |
| DE | 102010014530 A1 | 10/2011 |
| EP | 0296537 A2 | 12/1988 |

\* cited by examiner

RISER, INSTALLATION KIT, AND ELECTRICAL INSTALLATION

FIELD OF THE INVENTION

The invention relates to a riser, meeting fire functional integrity class E90, which is secured against downward movement and which in the event of fire ensures functional integrity by active support, even if the cable insulation of an electrical riser melts or burns off.

BACKGROUND OF THE INVENTION

Electrical risers ensure supply-relevant feeding of electrical power over electrical lines in or on buildings. Typically, the respective primary connections are led vertically into the various floors of the building, starting from the main building power supply, and are then branched into secondary connections. Thus, electrical risers make an essential contribution to functional integrity in building services technology, and to the necessary safety-relevant systems.

Due to this special importance, basic requirements for functional integrity apply to electrical risers. They must be designed in such a way that the safety-related installations and devices that rely on a power supply remain functional for a sufficient period of time, even in the event of fire. These safety-related installations and devices just mentioned include, for example, safety lighting, fire mode control of passenger elevators, fire alarms, and systems for alerting and provision of instructions.

An electrical line system is made up of one or more electrical cables and a support structure. The electrical cables must be supported by the support structure in accordance with DIN VDE 0100-520 and DIN 4102-12. If the support structure provides for a layout of an electrical cable in the vertical direction, it is referred to as an electrical riser. A plurality of risers may be vertically guided in parallel in a so-called riser conduit through a building.

In particular in large buildings, a plurality of electrical risers designed as parallel power cables or data cables are required. In this case, instead of customary round cables, flat cables are used, which can guide the approximately 90 line cores in parallel to one another.

For a continuous tensile stress on cables and line systems due to the intrinsic weight, for example, DIN VDE 0100-520, Section 522.8.1.4 requires that for a vertical layout, the type of line design, the cross section, and the type of fastening must be suitable, as required by Section 522.8.1.3, to effectively avoid damage due to the intrinsic weight. For this reason, in riser conduits, risers are generally separately fixed to suitable walls with cable clamps at predefined intervals. The interval spacing depends on the weight of the cable per meter.

Support structures for riser conduits that are not directly fastened to the wall are generally made up of a vertical ladder in which rungs or profile rails are horizontally attached, with a maximum spacing of 300 mm, to two vertical retaining rails. The cables in the riser conduit are supported on each rung or profile rail via suitable single clamps or bracket clamps.

Unlike the situation for a horizontal layout, in which electrical lines on their support structures may be combined into groups of many cables in cable ducts, vertically guided electrical cables must be either fixed separately by single clamps, or, in the case of round cables, put together with bracket clamps, using up to three cables, although the spacings of the electrical cables in the bracket clamp must correspond to the spacing for a layout of single clamps.

In the context of fastening electrical lines, but in particular for installing electrical risers, cable clamps in the form of single clamps or bracket clamps having a corresponding clamping effect are generally used. Cable clamps are known for round cables as well as for flat cables. A cable clamp functions according to the clamping principle. It surrounds the cable in such a way that the insulation of the cable is firmly enclosed. The size of the cable clamp to be used is a function of the cable diameter in order to ensure the required support. The relief of load from the weight results from fastening the clamp to the support structure or to the wall. For a bracket clamp, multiple such single clamps are combined into a unit that is fastened to the support structure or wall. A bracket clamp may hold up three cables in this way, with the radius of an individual cable, in the case of round cables, being 25 mm maximum. Instead of a clamp that completely surrounds the cable, clamps are also known that have an opening on one side. These clamps are placed on the cable and fixed to the wall, generally using screws, so that the cable is clamped between the wall and the clamp.

In addition, clamping devices for various clamping items are known from DE 102006021555 (A1), EP 0296537 (A2), U.S. Pat. No. 4,318,563 (A), or DE 10240551(A1), for example.

To meet fire protection regulations, the test requirements for electrical line systems according to DIN 4102-12 with functional integrity classes E30, E60, and E90 apply. Thus, for example, in safety-related systems a fire resistance period of 90 minutes (E90) for the electrical line system must be ensured. The actual fire resistance period of a line system is determined by the characteristics of the cable and also by the support structure of the electrical line system.

Depending on the characteristics and layout of a cable as well as the design of the power supply, a distinction is made between basically two forms of support structures for fire functional integrity. A standard-specific support structure implements the parameters defined in DIN 4102-12, based on specified criteria. A cable-specific support structure is a tested cable system based on DIN 4102-12, with defined deviations.

A special requirement applies for risers under DIN 4102-12 8.3: active support of the cable with functional integrity must be provided in the event of fire. The aim is to ensure that the electrical line system, as an overall structure, consistently meets the requirements of its functional integrity class. Risers are particularly at risk here. Although cables in the riser must already be supported at suitable intervals and relieved of load on account of their high weight to prevent the line from tearing away, in the event of fire the support required under DIN VDE 0100-520 is no longer adequately provided by single clamps and bracket clamps. The diameter of the cable decreases due to melting of the cable insulation in the event of fire. The cable clamps that are adapted to the cable diameter during installation then can no longer prevent slipping through, and the intrinsic weight of the cable is thus no longer supported. To achieve an effective support mount under DIN 4102-12 8.3, the following approaches to the stated standard are generally known:

1. In addition to the general support by cable clamps at predefined intervals, the cable is also supported by a lateral, horizontally extending projection of at least 300 mm after every 3500-mm vertical interval of the riser conduit (meandering layout). The support by a meandering layout requires appropriate space in the surroundings of the riser. This is taken into account from the outset in the planning of the riser conduit.

2. In addition to the general support by cable clamps at predefined intervals under DIN VDE 0100-520, installation of a strain relief device in riser conduits is known. This strain relief device is made up of a fire-resistant attachment, generally made of mineral fiber boards, that is mounted on the riser conduit at predefined intervals of 3500 mm. Since only the weight of a 3500-mm length of cable is suspended on this strain relief device due to the interval control, the aim is to reduce the risk of the cable tearing off, even in the event of fire. The strain relief device is based on the principle of thermal insulation. By protecting the fastening points, to which the risers are fixed with cable clamps, by a heat-resistant cover, the objective is to delay melting or burnoff of the line insulation at the fastening points.

BRIEF DESCRIPTION OF THE INVENTION

A first aspect of the invention relates to a riser that is secured against downward movement, having an electrical riser flat cable that extends vertically or with a vertical component, and at least one riser securing device, surrounding the flat cable, for securing the riser flat cable against downward movement by pressing the flat cable against a nonconductive pressing surface in the absence of a fire and in the event of fire. The riser securing device includes an electrically nonconductive, fire-resistant clamping element, spaced apart from the pressing surface, that is freely movably guided in an oblique guide that reduces the distance of the clamping element from the pressing surface during downward movement of the clamping element. When a downward tensile force acts on the flat cable, the flat cable is pressable against the pressing surface by the clamping element that is freely movable in the oblique guide and thus variable in its distance from the pressing surface, even when there is a change in the cable thickness, and is thus clampable between the clamping element and the pressing surface. The variability in spacing of the clamp corresponds at least to the difference between the thickness of the flat cable in the intact state and the thickness of the flat cable in the state of melted or burnt-off cable insulation.

A further aspect relates to an installation kit having at least one riser securing device according to the first aspect and at least one riser that includes at least one flat cable.

A further aspect relates to an electrical installation, including a riser that is secured against downward movement, having an electrical riser flat cable that extends vertically or with a vertical component, and at least one riser securing device, surrounding the flat cable, according to the first aspect, wherein the riser securing device is mounted on a building wall that forms the insulating pressing surface as a counterpart to the clamping element, or the riser securing device is equipped with an insulating pressing surface, as a counterpart to the clamping element, that forms a part of the riser securing device itself.

GENERAL DESCRIPTION, ALSO WITH REGARD TO OPTIONAL EMBODIMENTS OF THE INVENTION

The first aspect, relating to a riser that is secured against downward movement, includes a retaining device and a nonconductive, fire-resistant clamping element. The retaining device in turn includes a bracket and a fastening device. The bracket is made of stainless steel, for example (stainless steel bracket). The fastening device is used for installing the riser securing device on a fireproof backing as a nonconductive pressing surface. The riser flat cable may be guided through between the nonconductive pressing surface and the bracket of the retaining device. A nonconductive, fire-resistant clamping element may be suspended in an oblique guide of the retaining device, via an axis of the clamping element that passes through the clamping element, in such a way that the distance of the clamping element from the pressing surface is reduced during downward movement of the clamping element. As a result, the riser flat cable is clamped between the nonconductive, fire-resistant clamping element and the nonconductive pressing surface, even if the cable insulation melts or burns off.

The clamping takes place in such a way that, as a result of the downward tensile force acting on the flat cable, the flat cable is pressable against the pressing surface by the clamping element that is freely movable in the oblique guide and thus variable in its distance from the pressing surface, even when there is a change in the cable thickness, and is thus clampable between the clamping element and the pressing surface. The cable insulation melts in the event of fire. Due to the fact that the clamping element is variable in its spacing and is anchored in the bracket in a freely movable manner, it slides due to its weight force, corresponding to the changed circumference of the cable, and maintains the clamping effect even when the insulation of conductor cores of the riser flat cable has been completely stripped due to fire.

The clamping element presses the flat cable against the pressing surface. The clamping element thus creates resistance, caused by friction, between the riser flat cable and the pressing surface against slipping through of the flat cable and slipping of cable cores that are stripped in the event of fire. For this purpose, the angle of the oblique guide relative to the pressing surface is sufficiently small, i.e., selected to be acute enough, to bring about the required static friction for creating the resistance. As a result, the downward tensile force acting on the flat cable is converted into a clamping force, so that, for example, an increase in the tensile force causes a corresponding increase in the clamping force, but not, for example, opening of the riser securing device that is formed by the clamping element and the oblique guide.

Friction between the flat cable and the clamping element is not necessary for the clamping effect. The clamping element may thus also be designed as a freely rotatable clamping roller, which itself causes little or no frictional drag with respect to the riser flat cable. Rather, the clamping roller essentially has the function of pressing the flat cable against the pressing surface, so that for the most part only the friction, created by this pressing force, between the flat cable and the pressing surface prevents the riser flat cable from slipping through.

The riser may be effectively supported, without interruption, by the continuous clamping effect of the riser securing device, even in the event of fire, without a lateral layout or thermal insulation. For risers having flat cables, the option for a continuously vertical layout with the riser securing device has the effect that the behavior of flat cables in avoiding short circuits is maintained. Whereas the line cores, separated from one another by their own insulation, are twisted together in a round cable, and the intersection points of the line cores may easily result in a short circuit if the core insulation melts or burns off, a flat cable, due to the absence of these intersection points, has much better performance due to the parallel guiding of the cable cores. In the event of fire, however, the favorable parallel guiding can be effectively maintained only if the flat cable has a continuously vertical layout. If the flat cable is laid horizontally, in the event of fire the individual line cores would be pulled toward one another from top to bottom due to their own weight if the core insulation melted or burned off, so that they could possibly contact one another, thus increasing the risk of a short circuit.

Since each riser in a riser conduit is continuously vertically secured with its own riser securing device, there is no limitation to a maximally achievable width of the riser conduit, or to additional space resources due to horizontally laid sections.

For the fastening and securing of risers that are present as flat cables, the riser securing device as described above allows a continuous vertical installation that is favorable for maintaining the behavior in avoiding short circuits. On the other hand, the clamping element prevents the individual cable cores from slipping and making contact, even if the core insulation of the flat cable is completely melted or burned off. Some embodiments of the clamping element and of the retaining device have an additional assisting effect for this aspect of the functional integrity of the flat cable, in that the cable cores are fixed separately from one another, and contact with the bracket is prevented.

The fastening device in its various embodiments allows installation of the riser securing device for newly installed risers and riser conduits as an alternative to using conventional cable clamps, as well as subsequent securing of risers and riser conduits that are already present. In addition, the fastening device assists with installation, using simple mounting principles in both cases. Depending on the embodiment, the riser, via the fastening device, may be secured to a backing in the form of a wall which meets the fire protection guidelines, and may also be secured to a profile rail in a riser conduit.

In the installation, in each case a riser securing device may be fastened to the wall with screws, at the spacing specified by DIN 4102-12, up to the overall height of the riser. The riser flat cable may subsequently be pulled from the bottom to the top through the individual riser securing devices.

When the riser flat cable is pushed up, the clamping elements are deflected upwardly, so that the riser flat cable is not hindered. When the riser flat cable is released, the variably spaced, freely movable clamping element moves downwardly and clamps the riser flat cable to the wall. In this way, the riser flat cable may be moved upwardly piece by piece without falling down or slipping through during the installation.

Another installation method is used when the riser flat cable is already hanging down from an upper fastening point, or the riser is already installed, but is to be additionally supported by the riser securing device. In this case, the riser securing device is mounted directly on the cable that is already hanging down or already installed.

In one embodiment of the invention, the clamping element is designed as a clamping roller that is suspended in the oblique guide that passes through an axis in the retaining device. In some embodiments, the clamping roller is designed as a one-part clamping roller.

Another embodiment of the invention involves the design of the clamping element as a multi-part clamping roller. The design of the retaining device is the same as for the one-part clamping roller. Multiple adjacently situated, independent single clamping rollers are lined up in a row on the axis of the clamping element. The individual rollers in the center have a cylindrical recess with an internal diameter. The internal diameter is large enough, compared to the diameter of the axis, that it specifies a distance between the axis and the inner side of the particular roller, so that the rollers on the axis may simultaneously assume different heights in the retaining device. The individual rollers are thus independently variably spaced and freely movable. In the case of nonuniform melting or burning of the core insulation of the flat cable, or if there is soiling, individual sections of the flat cable are separately clamped, and may thus ensure support that is adapted to the unevennesses that are present. In addition, the separate clamping further assists with the property of reducing the likelihood of short circuits in flat cables, since each single clamping roller lies separately against a melted core insulation area in the event of stripping of insulation due to fire; the individual height of the single clamping rollers in the retaining device is adjusted, depending on how much of the core insulation is melted in an area.

In some embodiments, the retaining device includes a cable tie, wherein by means of the cable tie, during installation of the riser securing device the clamping element may be held against the riser in a topmost position of the oblique guide.

In a design having a single or multiple clamping roller(s), for installation the clamping element may thus be held by means of the cable tie in the topmost position of an oblique guide in order to not interfere with the installation. To achieve the same objective, as an alternative, in some embodiments a suspension mechanism, designed, for example, as a suspension projection of the oblique guide, may adjoin the oblique guide of the retaining device, in which the axis of the clamping roller may be suspended in a position above the oblique guide.

After installation, this cable tie is separated; i.e., the axis of the clamping roller is lifted from the suspension slot and placed back in the oblique guide, and the riser securing device is released, in which, due to its variable spacing and free movability, the clamping element slides into the clamping position within the oblique guide.

In one embodiment of the invention in which the clamping element is designed as a one-part or multi-part clamping roller, the riser securing device may be equipped with a screw lock for tightening the riser flat cable during installation of the riser. The deflection of the clamping roller is limited in the upward direction by a locking screw in the direction of the oblique guide, in which the clamping roller is suspended in a variably spaced and freely movable manner. To stretch the riser flat cable between two riser securing devices during the installation of a riser, pulling through of the riser flat cable may be prevented by closing the screw lock of the lower riser securing device in order to achieve tightening. When the screw lock is closed, the locking screw, with the riser securing device released, is introduced far enough that it contacts the clamping element so that the clamping element cannot be deflected upwardly. Thus, the riser flat cable may be pulled in the top area without the fixing to the lower riser securing device coming loose at the top.

When the retaining device includes a cable tie for facilitating installation, and a screw lock, the adjustment of the riser flat cable takes place by means of the screw lock, after releasing the riser securing device by separating the cable tie.

In another embodiment of the invention, the clamping element is designed as an eccentric clamping element that is fastened to the retaining device so as to be rotationally movable about an axis with infinite variability. The axis of the clamping element is mounted at a fixed position on the retaining device. In some embodiments, the eccentric clamping element is designed as a single clamping element. In other embodiments, the eccentric clamping element is designed as a multi-part eccentric clamping element that includes multiple eccentric single clamping elements.

The eccentric single clamping elements, the same as for the multi-part clamping rollers, clamp the cores of the riser at different heights, and thus ensure support that is adapted to the unevennesses of the riser surface due to fire. Since the axis on which the clamping element is suspended is mounted at a fixed position in the retaining device, it is additionally protected from blockage of the clamp in an oblique guide due to falling debris or flying particles in the event of fire.

In another embodiment of the invention, the fire functional integrity for risers with flat cables is additionally assisted by supplementing the riser securing device with a nonconductive, fire-resistant base plate made of ceramic, for example. During installation, the base plate is placed between the pressing surface and the flat cable, and together with the riser securing device is fastened by screws of the appropriate fire protection class. The base plate has two vertically extending nonconductive, fire-resistant rails made of ceramic, for example, whose spacing from one another is slightly less than the width of the bracket of the retaining device. Thus, during installation they may each be placed between the side walls of the bracket of the retaining device and the flat cable. If the core insulation of the flat cable melts or burns off in the event of fire, the stripped conductors are thus prevented from coming into contact with the bracket of the retaining device and thus triggering a short circuit.

In the installation of the riser securing device with a base plate, in the case of a riser that is already hanging down or installed, initially a base plate is placed beneath the flat cable, and the installation is continued from the top by screwing on the riser securing device from above, above the cable and through the base plate.

In one embodiment of the invention, the riser securing device may be fastened to a profile rail. The profile rail in this case forms a fireproof backing as a fastening base for the nonconductive, likewise fireproof pressing surface. For this purpose, the riser securing device is supplemented with a nonconductive, fire-resistant anti-twist protector made of ceramic, for example. The fastening device has a hook formation for fixing to the profile rail. The anti-twist protector is fixed on the profile rail by screwing it in. At the edges perpendicular to the cable path, the anti-twist protector in each case has a nonconductive, fire-resistant rail made of ceramic, for example, that holds the riser flat cable in the correct position, i.e., in the untwisted position, within the riser securing device. This protects line cores, stripped in the event of fire, from contact with the profile rail or the bracket of the retaining device, and from a resulting short circuit. The riser securing device is hooked into the profile rail via the hook formation of the fastening device.

In this embodiment of the invention as well, a new installation of the riser during installation, and also a subsequent installation for a riser that is already suspended or present, are possible. In both cases, the installation follows the principles described above.

BRIEF DESCRIPTION OF THE DRAWINGS

The appended drawings illustrate specific exemplary embodiments of various aspects of the invention. The drawings show the following:

FIG. 3: shows a riser securing device with an eccentric clamping element on a profile rail, for a new installation;

DESCRIPTION OF EXEMPLARY
EMBODIMENTS WITH REFERENCE TO THE
DRAWINGS

Figure 1:
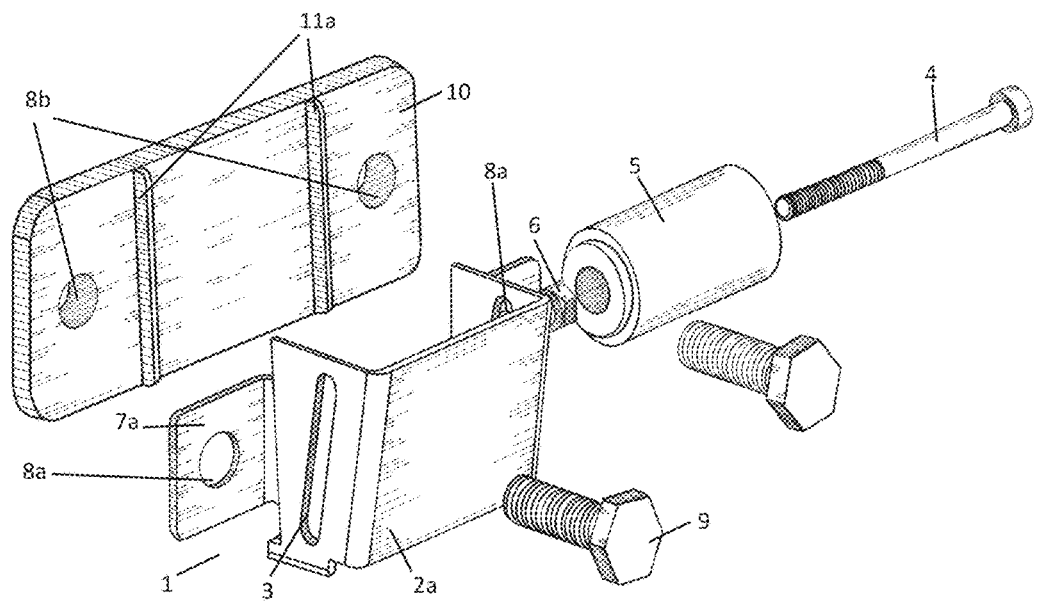
FIG. 1: shows an exploded drawing of one design of the riser securing device, with an optional base plate and a one-part clamping roller.

FIG. 1 shows a design of the riser securing device of the riser as an exploded drawing. In this exemplary embodiment, the retaining device 1 has a stainless steel bracket 2a with an oblique guide 3 in which a one-part ceramic roller 5 as a clamping element is suspended with variable spacing and in a freely movable manner via an axis of the clamping element 4. The axis of the clamping element 4 is freely movably anchored in the oblique guide 3 by means of a locking nut 6. In this exemplary embodiment, the fastening device 7a is provided for being screwed to a fireproof backing such as a fire protection wall, and has screw holes 8a and fire-resistant screws 9. A base plate 10 may optionally be mounted beneath the riser flat cable. The base plate has two perpendicularly extending ceramic rails 11a and corresponding screw holes 8b. During installation with the base plate 10, the base plate is placed behind the riser flat cable, and the riser securing device is placed on the riser flat cable. The fire-resistant screws 9 are then guided through the screw holes 8a in the fastening device 7a of the retaining device 1 and through the screw holes 8b in the base plate 10, and screwed onto the fireproof backing.

Figure 2:
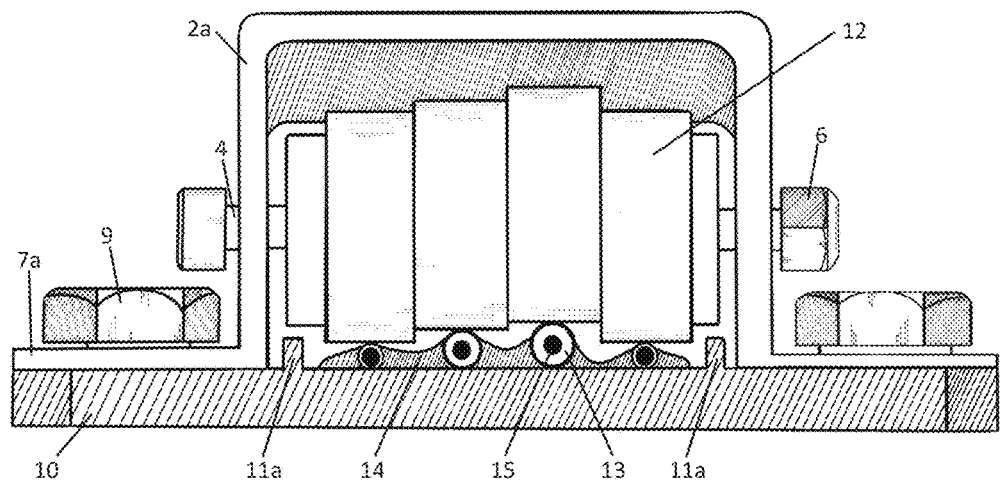
FIG. 2: shows a riser securing device with a flat cable, using the multi-part clamping roller when the line cores are melted or burned off; top view, in a design for a wall fastening using screws with a base plate.

FIG. 2 shows a top view of the riser securing device with a multi-part clamping roller and a base plate 10. Multiple clamping rollers 12 are lined up in a row on the axis of the clamping element 4. In the event of fire, the core sheathings 13 of the individual cable cores 15 of the riser flat cable 14 melt at different rates, so that the clamping rollers 12 may adapt to the different heights of the flat cable 14. The individual cable cores 15 are thus clamped to the base plate 10 until the sheathing 13 has completely melted or burned off. Contact of the cable cores 15 with the bracket 2a is prevented by the rails 11a of the base plate 10.

Figure 3A:
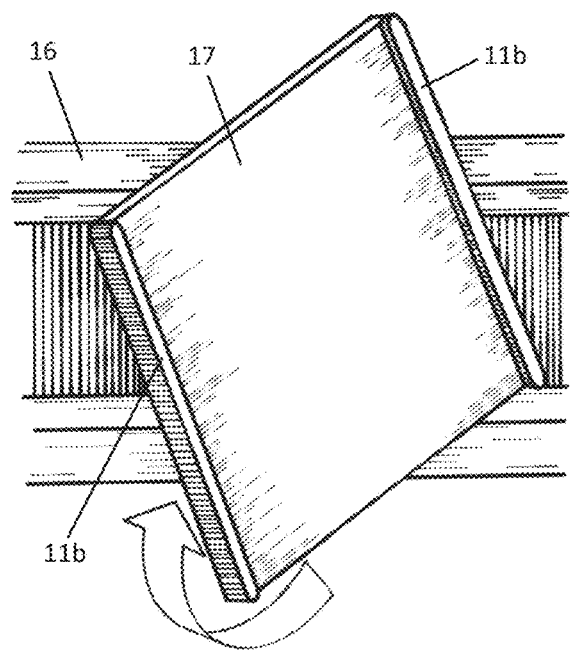
FIG. 3a: shows screwing the anti-twist protector into the profile rail.

To fasten the riser securing device to a profile rail 16, as shown in FIG. 3a, initially a nonconductive, fire-resistant anti-twist protector 17 is screwed into the profile rail 16. Due to lateral ceramic rails 11b, the anti-twist protector ensures correct positioning of the flat cable 14, and prevents contact of the line cores 15 (similar to FIG. 2) with the bracket 2b or the profile rail 16.

Figure 3B:
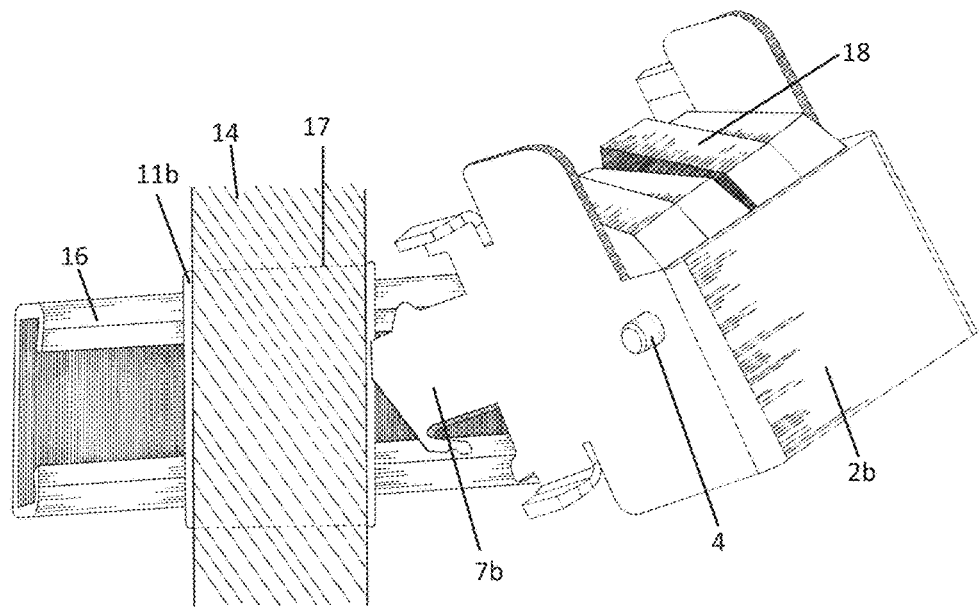
FIG. 3b: shows a flat cable fixed in the anti-twist protector, mounting the riser securing device with eccentric clamping elements, in a design with a fastening device for a profile rail with a hook formation.
Figure 4:
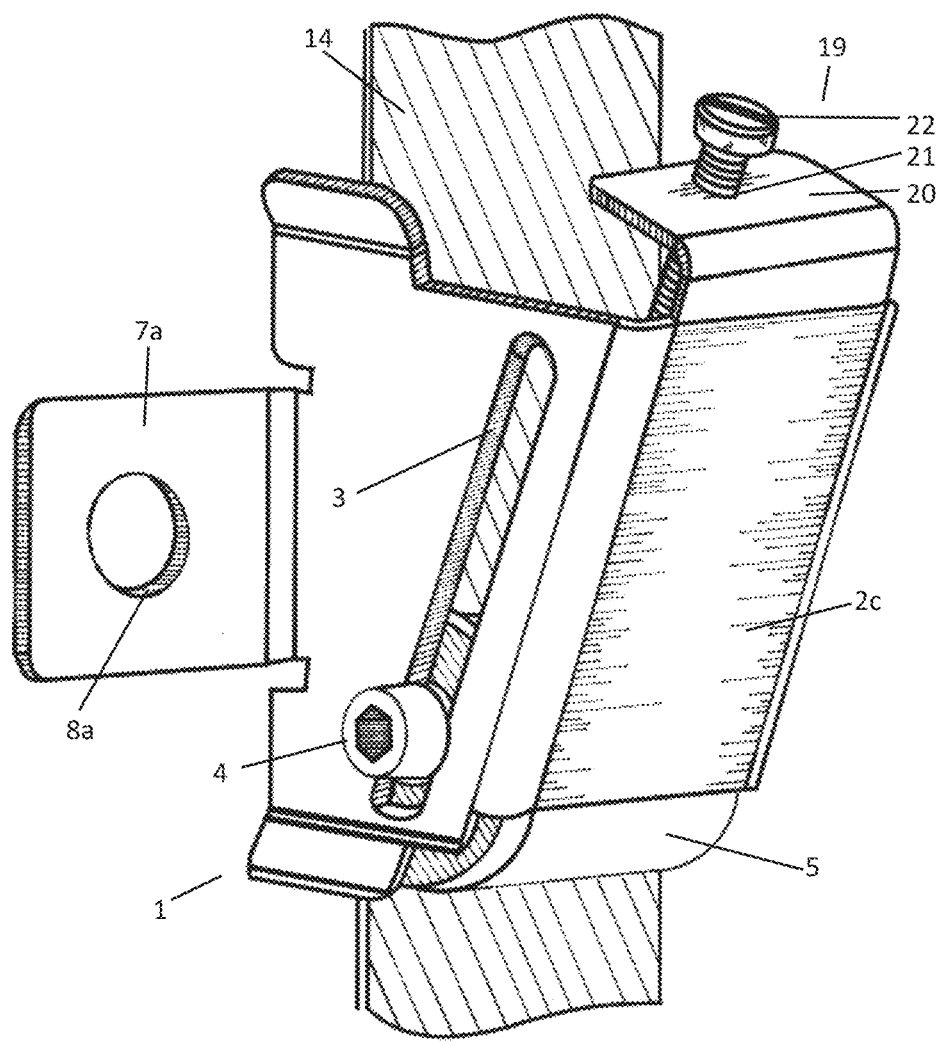
FIG. 4: shows a riser securing device for a flat cable, having a screw lock; side view, in a design with a fastening device for wall fastening using screws.

When the flat cable 14 is positioned in the anti-twist protector 17, as shown in FIG. 3b, the riser securing device via the fastening device with a hook formation 7b may be hooked into the profile rail 16 on the positioned flat cable 14.

The riser securing device with eccentric clamping elements 18 is also shown in this exemplary embodiment. Multiple independent eccentric clamping elements 18 are lined up in a row at a fixed position via an axis of the clamping element 4 so as to be rotationally movable with infinite variability. The same as for the multi-part clamping roller, the individual clamping elements 18 may clamp at different heights.

Another exemplary embodiment shows the riser securing device with a screw lock 19, via which the riser flat cable 14 may be tightened when installed between two riser securing devices. The screw lock 19 is made up of a screw mounting 20, which as an extension of the retaining device 1 bends above the bracket 2c at a right angle to the oblique guide 3, and has a screw hole with a thread 21. Positioned in the screw hole 21, in parallel to the oblique guide 3, is a locking screw 22 that fixes a one-part clamping roller 5 from above. The riser securing device is thus prevented from opening at the top. This allows simpler tightening of the riser flat cable 14 between two riser securing devices in the riser. When the riser flat cable 14 is fixed in a lower riser securing device by the screw lock 19, the riser flat cable 14 may be pulled tight in a riser securing device situated thereabove, without the fixed riser flat cable 14 coming loose.

Figure 5:
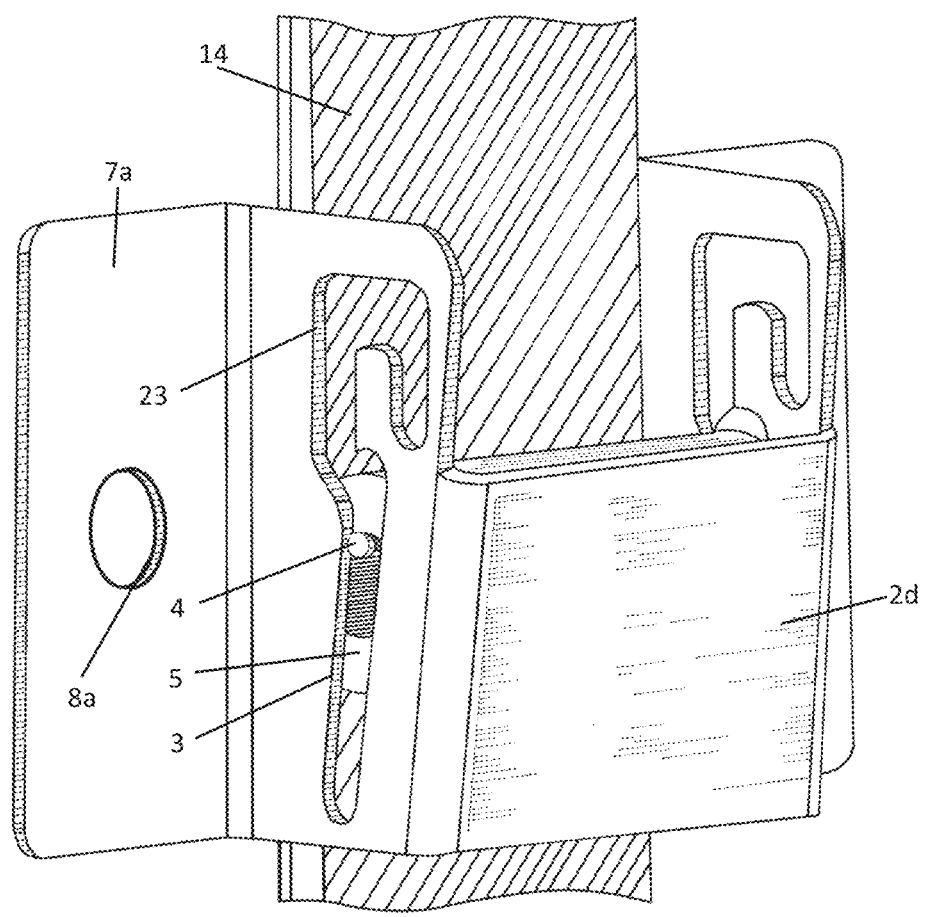
FIG. 5: shows an oblique guide with a suspension mechanism.

As shown in FIG. 5, the oblique guide 3 may have a suspension projection 23 in order to suspend the axis of the clamping roller 4 together with the clamping roller 5 above the oblique guide 3 during installation of the flat cable 14, so that the oblique guide does not clamp the flat cable 14 during the installation operation. Also in this possible embodiment, the stainless steel bracket 2d is fastened to a fireproof backing via the fastening device 7a, which has screw holes 8a.

As a whole, the riser that is secured against downward movement, having an electrical riser flat cable that extends vertically or with a vertical component, and a securing device that surrounds the flat cable, represents a novel riser with E90 fire functional integrity for riser flat cables.

The invention claimed is:

1. A riser that is secured against downward movement, comprising:
    an electrical riser flat cable that extends vertically or with a vertical component; and
    at least one riser securing device, surrounding the flat cable, for securing the riser flat cable against downward movement by pressing the flat cable against a nonconductive pressing surface in the absence of a fire and in the event of fire, wherein the riser securing device includes an electrically nonconductive, fire-resistant clamping element, spaced apart from the pressing surface, that is freely movably guided in an oblique guide that reduces a distance of the clamping element from the pressing surface during downward movement of the clamping element; and
    wherein when a downward tensile force acts on the flat cable, the flat cable is pressable against the pressing surface by the clamping element that is freely movable in the oblique guide and thus variable in its distance from the pressing surface, even when there is a change in cable thickness, and is thus clampable between the clamping element and the pressing surface, wherein the variability in spacing of the clamp corresponds at least to a difference between the thickness of the flat cable in an intact state and the thickness of the flat cable in a state of melted or burnt-off cable insulation.

2. The riser according to claim 1, wherein the clamping element is designed as a clamping roller.

3. The riser according to claim 2, wherein the clamping element is designed as a one-part clamping roller.

4. The riser according to claim 2, wherein the clamping element is designed as a multi-part clamping roller, wherein the multi-part clamping roller includes multiple adjacently situated, independent single clamping rollers lined up in a row on an axis.

5. The riser according to claim 2, wherein the riser includes a retaining device having a screw lock, wherein the screw lock in the direction of the oblique guide, in which the clamping roller is guided in a variably spaced and freely movable manner, in a closed state limits deflection of the clamping roller in an upward direction.

6. The riser according to claim 2, wherein the riser securing device includes a retaining device having a cable tie, wherein by means of the cable tie, during installation of the riser securing device on the riser, the clamping element is held in a topmost position of the oblique guide.

7. The riser according to claim 2, wherein the riser securing device includes a retaining device having a suspension mechanism, adjoining the oblique guide above same, in which the axis of the clamping roller is suspendable in a position above the oblique guide.

8. The riser according to claim 1, wherein the clamping element is designed as an eccentric clamping element.

9. The riser according to claim 8, wherein the eccentric clamping element is designed as a multi-part eccentric clamping element that includes multiple adjacently situated, independent eccentric single clamping elements.

10. The riser according to claim 8, wherein the eccentric clamping element is rotationally movable with infinite variability about the axis of the clamping element fastened to a retaining device, wherein the axis of the clamping element is mounted at a fixed position in the retaining device.

11. The riser according to claim 2, wherein the riser securing device includes a nonconductive, fire-resistant base plate.

12. The riser according to claim 2, wherein the riser securing device includes a nonconductive, fire-resistant anti-twist protector that is mounted on a profile rail, wherein a fastening device has a hook formation for suspension in the profile rail.

13. An installation kit having at least one riser according to claim 1 and at least one riser flat cable.

14. An electrical installation, including a riser that is secured against downward movement, having an electrical riser flat cable that extends vertically or with a vertical component, and at least one riser securing device, surrounding the flat cable, according to claim 1, wherein
    (i) the riser securing device is mounted on a building wall that forms the insulating pressing surface as a counterpart to the clamping element, or
    (ii) the riser securing device is equipped with an insulating pressing surface, as a counterpart to the clamping element, that forms a part of the riser securing device itself.

* * * * *